(12) United States Patent
Douglas et al.

(10) Patent No.: US 7,370,128 B2
(45) Date of Patent: May 6, 2008

(54) EXPANDER DEVICE CAPABLE OF COMMUNICATION PROTOCOL TRANSLATION

(75) Inventors: Chet R. Douglas, Tucson, AZ (US); Nathan E. Marushak, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/976,536

(22) Filed: Oct. 29, 2004

(65) Prior Publication Data

US 2006/0095599 A1     May 4, 2006

(51) Int. Cl.
G06F 13/12     (2006.01)
G06F 13/36     (2006.01)

(52) U.S. Cl. .................... 710/74; 710/62; 710/315
(58) Field of Classification Search .............. 710/62
See application file for complete search history.

(56) References Cited

U.S. PATENT DOCUMENTS

| | | | |
|---|---|---|---|
| 5,499,378 A | 3/1996 | Mc Neill, Jr. | |
| 5,748,924 A | 5/1998 | Llorens | |
| 5,802,327 A | 9/1998 | Hawley | |
| 5,892,964 A | 4/1999 | Horan | |
| 6,286,056 B1 | 9/2001 | Edgar | |
| 6,480,925 B1 | 11/2002 | Bodo | |
| 6,601,119 B1 | 7/2003 | Slutz | |
| 6,654,902 B1 | 11/2003 | Brunelle | |
| 6,804,703 B1 | 10/2004 | Allen | |
| 6,965,956 B1* | 11/2005 | Herz et al. .................. 710/74 |
| 6,996,642 B2 | 2/2006 | Apperley | |
| 7,058,749 B2* | 6/2006 | Loffink ................... 710/313 |
| 7,181,562 B1* | 2/2007 | Stenfort et al. ............ 710/315 |
| 7,206,875 B2 | 4/2007 | Marushak et al. | |
| 2002/0133714 A1 | 9/2002 | Sales | |
| 2003/0065782 A1 | 4/2003 | Nishanov | |
| 2003/0163628 A1 | 8/2003 | Lin | |
| 2003/0188233 A1 | 10/2003 | Lubbers | |
| 2004/0044800 A1* | 3/2004 | Krehbiel et al. ............ 710/1 |
| 2004/0117522 A1 | 6/2004 | Loffink | |

(Continued)

FOREIGN PATENT DOCUMENTS

EP     1246060 B1     10/2001

(Continued)

OTHER PUBLICATIONS

PCI Express Base Specification Revision 1.0, Jul. 22, 2002, 15 pgs.

(Continued)

*Primary Examiner*—Alford Kindred
*Assistant Examiner*—David Martinez
(74) *Attorney, Agent, or Firm*—Grossman, Tucker, Perreault & Pfleger, PLLC

(57) ABSTRACT

A method according to one embodiment may include communicating, by an expander device, with at least one initiator engine using at least a first communication protocol and at least one target storage device using at least a second communication protocol. The method of this embodiment may also include translating, by the expander device, between first commands transmitted using the first communication protocol and second commands transmitted using the second communication protocol. Of course, many alternatives, variations, and modifications are possible without departing from this embodiment.

40 Claims, 4 Drawing Sheets

U.S. PATENT DOCUMENTS

| | | | |
|---|---|---|---|
| 2004/0117678 A1* | 6/2004 | Soltis et al. | 713/320 |
| 2004/0148460 A1 | 7/2004 | Steinmetz | |
| 2004/0148461 A1 | 7/2004 | Steinmetz | |
| 2004/0205288 A1 | 10/2004 | Ghaffari | |
| 2004/0236908 A1 | 11/2004 | Suzuki | |
| 2004/0267516 A1 | 12/2004 | Jibbe | |
| 2005/0108452 A1* | 5/2005 | Loffink | 710/74 |
| 2005/0193159 A1 | 9/2005 | Ng | |
| 2005/0193235 A1 | 9/2005 | Sandorfi | |
| 2005/0216604 A1* | 9/2005 | Loffink et al. | 710/3 |
| 2005/0278465 A1* | 12/2005 | Qi | 710/36 |
| 2006/0025018 A1 | 2/2006 | Dube | |
| 2006/0031612 A1* | 2/2006 | Bashford et al. | 710/74 |
| 2006/0041691 A1* | 2/2006 | Bashford et al. | 710/8 |

FOREIGN PATENT DOCUMENTS

| | | |
|---|---|---|
| EP | 1246060 A1 | 10/2002 |
| EP | 1321848 A3 | 12/2002 |

OTHER PUBLICATIONS

PCI-X Addendum to the PCI Local Bus Specification Revision 1.0a, Jul. 24, 2000 PCI Special Interest Group, 9 pgs.

American National Standard: For Information Technology-Fibre Channel-Physical and Signalling Interface-3 (FC-PH-3) Developed by Incits, 1998, 6 pgs.

Serial AT: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 9 pgs.

Information Technology—Serial Attached SCSI—1.1 (SAS-1.1), Working Draft American National Standard: Project T10/1601-D Revision 1, Sep. 18, 2003, 24 pgs.

Working Draft: Project T10/1416-D, Revision 13, May 16, 2003, Information Technology—SCSI Primary Commands—3 (SPC-3), 19 pgs.

Serial ATA II: Extensions to Serial ATA 1.0a Revision 1.2, Aug. 27, 2004, 4 pgs.

American National Standards for Information Technology, Working Draft T10/1675-D MMC-5 Revision 1, 627 pgs., Oct. 31, 2004.

American National Standard for Information Technology, Working Draft SCSI Block Commands—2 (SBC-2), T10/1417-D Revision 14, 142 pages, May 11, 2004.

American National Standard, Working Draft T13/1532D, vol. 1, Revision 4b, 390 pgs., Apr. 21, 2004.

American National Standard. Working Draft T10/1711-D, Revision 0.1, 79 pgs., Aug. 26, 2004.

Final Office action dated Jul. 18, 2006 for U.S. Appl. No. 10/815,270.

Notice of Allowance dated Dec. 8, 2006 for U.S. Appl. No. 10/815,270.

Office Action dated Feb. 15, 2006 for U.S. Appl. No. 10/815,270.

Weber, R.O. Information Technology-SCSI Primary Commands-3(SPC-3), Project T/10/1416-D, Revision 23, p. 62, May 4, 2005.

Final Office Action dated Jan. 2, 2008 for U.S. Appl. No. 10/975,255, 13 pages.

* cited by examiner

EXPANDER DEVICE CAPABLE OF COMMUNICATION PROTOCOL TRANSLATION

FIELD

The present disclosure relates to an expander device capable of communication protocol translation.

BACKGROUND

In one conventional data storage arrangement, a computer node includes a host bus adapter (HBA). The HBA communicates with a data storage system via one or more communication links using a communication protocol associated with the one or more links. Target devices in the data storage system may include devices that communicate using different communication protocols. In at least one conventional data storage arrangement, a communication protocol used by the HBA is incompatible with one or more target storage devices, and thus, the target storage device may not be able to fully take advantage of the communications protocol offered by the HBA. Thus, conventional data storage systems may limit the number of device types capable of taking advantage of the communications protocol offered by the HBA.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
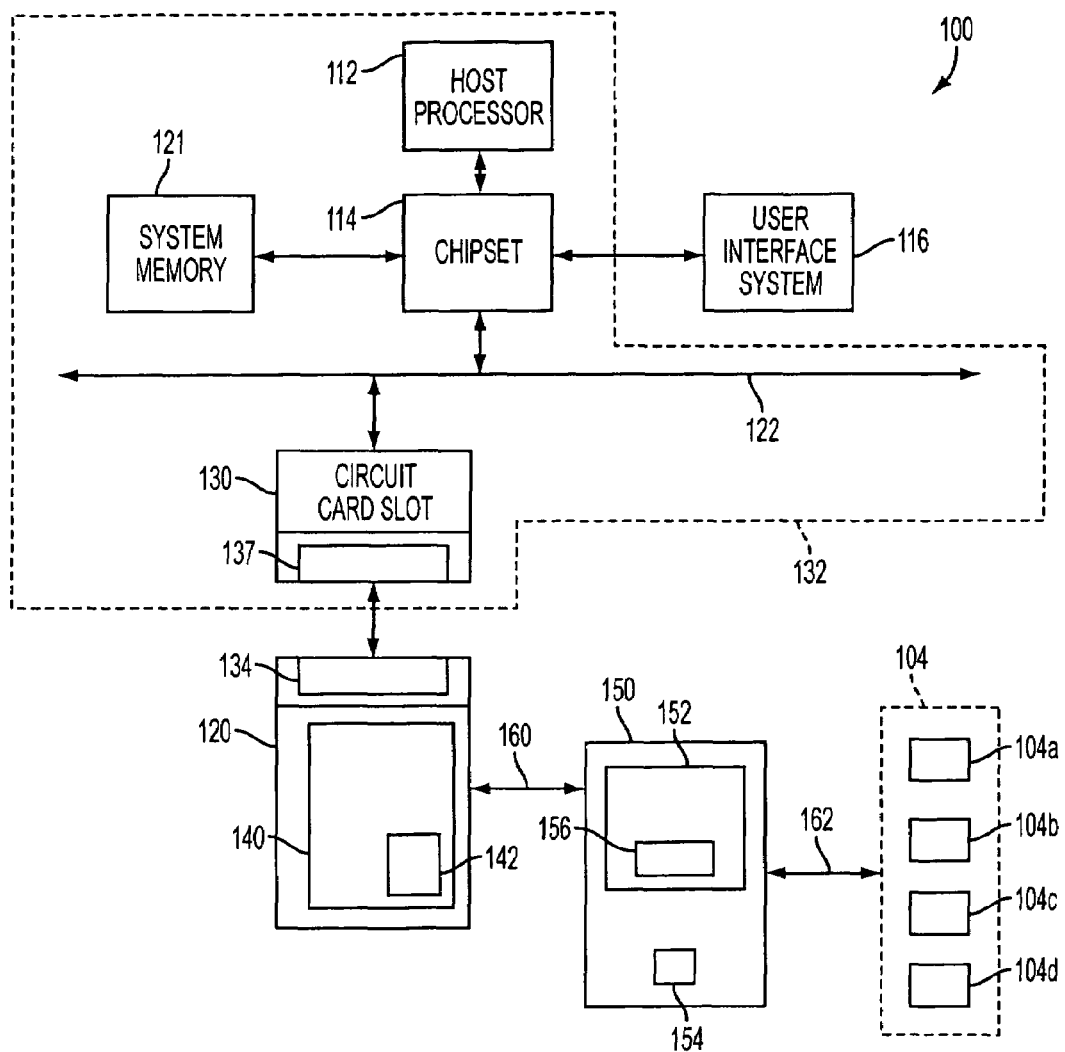
FIG. 1 is a diagram illustrating a system embodiment.

FIG. 1 illustrates a system embodiment 100 of the claimed subject matter. The system 100 may generally include a host processor 112, a bus 122, a user interface system 116, a chipset 114, system memory 121, a circuit card slot 130, and a circuit card 120 that is capable of communicating with the mass storage 104. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto one motherboard 132.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board. Processor 112, system memory 121, chipset 114, bus 122, and circuit card slot 130 may comprise a host system 132.

The circuit card 120 may communicate with the mass storage 104 using a plurality of communication protocols. Circuit card 120 may comprise a host bus adaptor (HBA) which may be capable of exchanging commands and data between processor 112 and mass storage 104. The circuit card 120 may comprise at least one protocol initiator engine 140 capable of initiating communication between the host system 132 and the mass storage 104. The initiator engine 140 may comprise an integrated circuit that may include circuitry that is capable of initiating communication between the host system 132 and the mass storage 104 to exchange data and/or command there between. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry may be embodied as, and/or form part of, one or more integrated circuits.

If a Fibre Channel (FC) protocol is used by circuit card 120 to exchange data and/or commands with mass storage 104, it may comply or be compatible with the interface/protocol described in "ANSI Standard Fibre Channel Physical and Signaling Interface-3 X3.303:1998 Specification." Alternatively or additionally, if a serial ATA (SATA) protocol is used by controller circuit card 120 to exchange data and/or commands with mass storage 104, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group earlier and/or later published versions of the SATA standard. Further alternatively or additionally, if a serial attached small computer system interface (SAS) protocol is used by controller circuit card 120 to exchange data and/or commands with mass storage 104, it may comply or be compatible with the protocol described in "Information Technology-Serial Attached SCSI-1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard. The SAS communication protocol may include one or more communication transport protocols, for example, Serial Advanced Attachment (ATA) Tunneled Protocol (STP) and Serial Small Computer System Interface (SCSI) Protocol (SSP).

Initiator engine 140 may comprise SAS initiator circuitry 142 ("SAS initiator engine" or "initiator engine") which may be capable of communicating using SAS communication protocols. SAS initiator engine 142 may be capable of generating one or more SCSI commands. "SCSI commands", as used in any embodiment herein, may comprise one or more commands as described in "Information Technology-SCSI Primary Commands-3 (SPC-3)" published on May 16, 2003 by the T10 Technical Committee of Accredited Standards Committee and/or earlier and/or later published versions, one or more commands as described in "Information Technology-Multimedia Commands-5 (MMC-5)" Working Draft American National Standard of International Committee For Information Technology Standards (INCITS) T10 Technical Committee, Project T10/1675-D, Revision 1, published Oct. 11, 2004, by American National Standards Institute and/or earlier and/or later published versions, and/or one or more commands as described in "Information Technology-SCSI Block Commands-2 (SBC-2)" Working Draft American National Standard of International Committee For Information Technology Standards (INCITS) T10 Technical Committee, Project T10/1417-D, Revision 14, published May 11, 2004, by American National Standards Institute and/or earlier and/or later published versions. In at least one embodiment described herein, initiator circuitry 142 may be capable of utilizing SSP transport protocol to communicate one or more SCSI commands.

Mass storage 104 may comprise one or more target Serial ATA (SATA) storage devices 104a, 104b, 104c and/or 104d each of which may comply or be compatible with SATA communication protocols (hereinafter "SATA devices" or "target storage devices"). SATA devices comprised in mass storage 104 may also be capable of generating and/or receiving one or more ATA/ATAPI commands. "ATA/ATAPI commands", as used in any embodiment herein, may comply or be compatible with one or more commands described in "Information Technology-AT Attachment With Packet Interface-7 Volume 1-Register Delivered Command Set, Logical Register Set (ATA/ATAPI-7 VI)" Working Draft American National Standard of International Committee For Information Technology Standards (INCITS) T13 Technical Committee, Project 1532D, Volume 1, Revision 4b, published Apr. 21, 2004, by American National Standards Institute and/or earlier and/or later published versions. ATA/ATAPI commands may be transmitted to one or more SATA devices or transmitted from one or more SATA devices using the aforementioned SATA communications protocol. In this embodiment, SATA devices may include, for example, hard disk drives, CD-ROM drives, DVD-ROM/RAM drives and/or any type of devices that may comply or is compatible with the SATA and/or ATA/ATAPI protocols. SATA devices comprised in mass storage 104 may comprise, individually or collectively, a clustered network storage environment. The network storage environment may comprise a SAS network.

The present embodiment may also comprise an expander device 150 coupled to circuit card 120 via communications link 160. The expander device may also be coupled to one or more SATA devices 104a, 104b, 104c and 104d comprised mass storage 104, via communication link 162. As used in any embodiment herein, an "expander device" may comprise an integrated circuit 152 which may comprise circuitry to transmit and/or receive at least one signal. Expander device 150 may be capable of permitting multiple devices to be coupled to one or more initiator engines. Expander device 150 may also provide device clustering which may provide sharing of multiple device resources between multiple initiator engines. As depicted in FIG. 1, the integrated circuit 152 may also be capable of expanding the number of target devices which may be coupled to circuit card 120, which may form a clustered network storage environment.

The integrated circuit 152 comprised in the expander device 150 may comprise protocol translator circuitry 156 and memory 154. Memory 154 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 154 may comprise other and/or later-developed types of computer-readable memory. Machine-readable firmware program instructions may be stored in memory 154. As described below, these instructions may be accessed and executed by translator circuitry 156. When executed by translator circuitry 156, these instructions may result in translator circuitry 156 performing the operations described herein as being performed by translator circuitry 156 and/or expander 150. Additionally, and as will be described in more detailed below, memory 154 and/or other memory (not shown) may be capable of storing one or more command sets.

In this embodiment, protocol translator circuitry 156 may be capable of translating between first commands transmitted using a first communication protocol and second commands transmitted using a second communication protocol. For example, protocol translator circuitry 156 may capable of translating between SCSI commands, as may be generated by SAS initiator circuitry 142, and ATA/ATAPI commands, as may be utilized by one or more SATA devices 104a, 104b, 104c and/or 104d. Thus, for example, initiator engine 142 may generate one or more SCSI commands, and communicate one or more SCSI commands to expander 150 using a SAS communications protocol via communications link 160. In response thereto, translator circuitry 156 may be capable of translating SCSI commands into corresponding ATA/ATAPI commands and transmitting the ATA/ATAPI commands to one or more SATA devices comprised in mass storage 104 using a SATA communications protocol via communications link 162. Of course, in this embodiment, translator circuitry 156 may also be capable of translating in the reverse direction, i.e., ATA/ATAPI commands (as may be generated by one or more SATA devices 104a, 104b, 104c, and/or 104d) into corresponding SCSI commands. Protocol translation circuitry 156 may be translating SCSI commands into ATA/ATAPI commands (and ATA/ATAPI commands into SCSI commands) using translation protocols as described in "Working Draft SCSI/ATA Translation (SAT)," Working Draft American National Standard of International Committee For Information Technology Standards (IN-CITS) T10 Technical Committee, Project T10/1711-D, Revision 0.1, published Aug. 26, 2004, by American National Standards Institute and/or earlier and/or later published versions.

Figure 2:
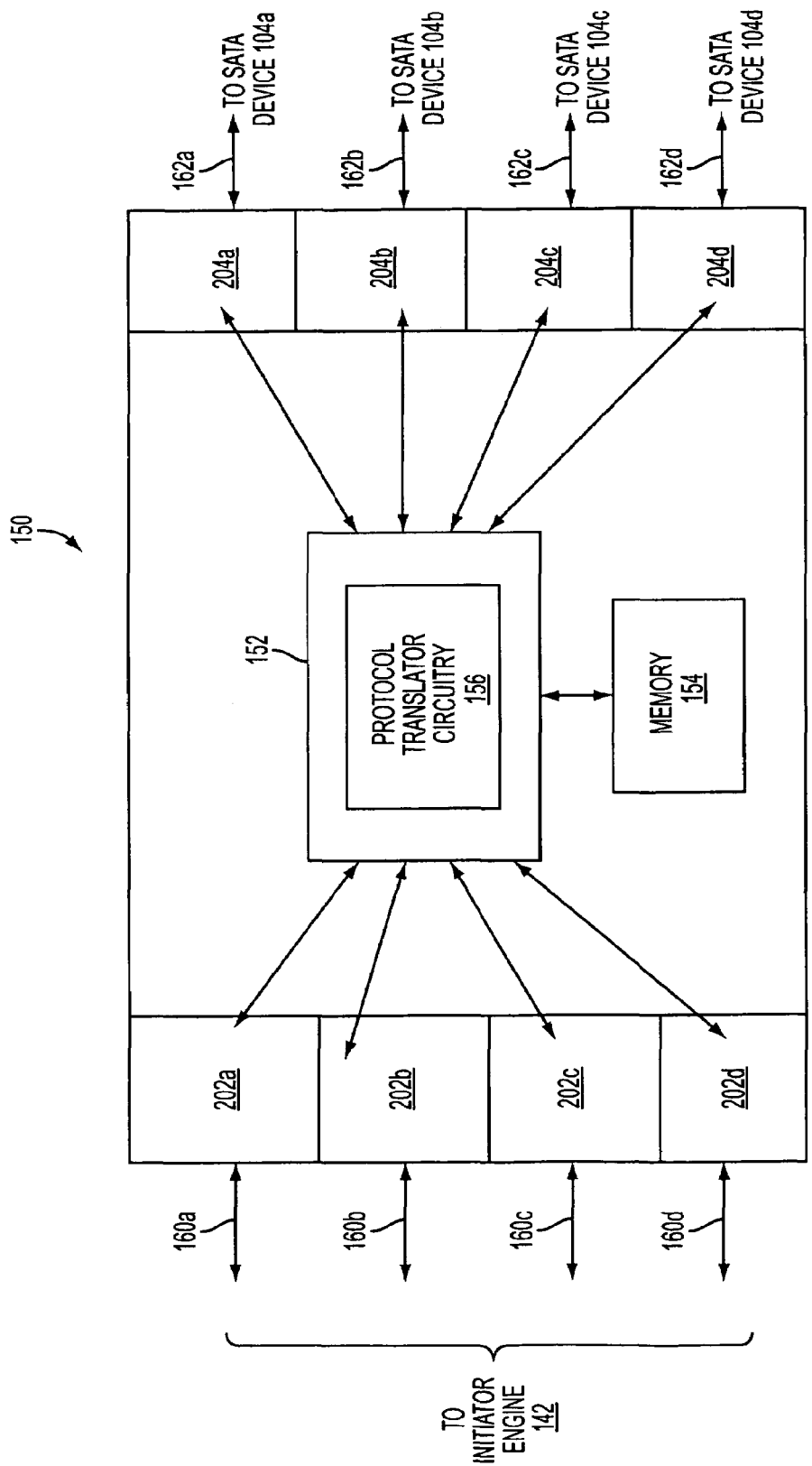
FIG. 2 is a diagram illustrating another exemplary embodiment of the expander of FIG. 1.

FIG. 2 depicts another embodiment of the expander 150 of FIG. 1. In FIG. 2, certain portions of the system 100 depicted in FIG. 1 have been omitted for clarity (for example circuit board 132 and circuit card 120), but it is to be understood that like parts of FIG. 2 can be implemented in a manner consistent with an embodiment depicted in FIG. 1, or alternatively in other system implementations, without departing from this embodiment. The expander device 150 of this embodiment may also comprise one or more upstream physical interfaces (PHYs), for example 202a, 202b, 202c and/or 202d which may be capable of electrically coupling expander device 150 with initiator engine 142. A "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. Each PHY may have a unique identifier. "Upstream PHY", as used in any embodiment herein, may be defined as a physical and/or virtual interface between the expander 150 and the circuit card 120. The expander device 150 may also comprise one or more ports (not shown). A port may contain one or more PHYs. For example, a narrow port may contain only one PHY, while a wide port may contain more than one PHY. In this embodiment, each upstream PHY may communicate with initiator engine 142 individually via respective communications links 160a, 160b, 160c, and/or 160d.

The expander device 150 may also include one or more downstream PHYs, for example, 204a, 204b, 204c, and/or 204d, which may be capable of electrically coupling expander device 150 with one or more respective SATA drives, for example 104a, 104b, 104c, and/or 104d comprised in mass storage 104. Each downstream PHY may communicate with individual SATA drives via respective communication links 162a, 162b, 162c, and/or 162d. In this embodiment, integrated circuit 152 may be capable of controlling one or more PHYs comprised in expander 150. For example, integrated circuit 152 and/or circuit card 120 may be capable of enabling or disabling one or more upstream PHYs and/or downstream PHYs. Also in this embodiment, integrated circuit 152 and/or circuit card 120 may be capable of designating one or more downstream PHYs as SAS communication protocol target PHYs and one or more upstream PHYs as SATA communication protocol target PHYs, thus permitting, for example, protocol translation circuitry 156 to provide protocol translation between SSP communications transport protocol and SATA communications protocols (and vice-versa) on a per PHY basis.

Exemplary SCSI Commands

As stated protocol translator circuitry 156 may be capable of translating between a first communication protocol and a second communication protocol. For example, protocol translator circuitry 156 may capable of translating between SCSI commands, as may be generated by SAS initiator circuitry 142, and ATA/ATAPI commands, as may be utilized by one or more SATA devices 104a, 104b, 104c and/or 104d.

One exemplary SCSI command set may include reservations. A reservation may be defined, for example, between one or more SATA drives comprised in the mass storage 104 and one or more initiator engines 142. "Reservations", as used in any embodiment herein, may comprise one or more SCSI Primary Commands capable of reserving one or more devices 104a, 104b, 104c, and/or 104d for one or more initiator engines 142. Also, "persistent reservations", as used in any embodiment herein, may mean that reservations, as may be defined by the aforementioned T10 standard, may be maintained across power cycles (i.e., reset and/or reboot events occurring at the circuit card 120, expander device 150 and/or one or more SATA devices). A reservation may mean initiator engine 142 may be granted exclusive access to an entire SATA device, or certain portions of a SATA device. Alternatively, reservations may mean that an initiator engine 142 is granted limited exclusive access, read-only access, write only access, and/or other reservations as may be defined in the aforementioned T10 standard. Conventional SATA drives do not support reservations or persistent reservations. Accordingly, in this embodiment, the expander device 150 may be capable of receiving SCSI commands to provide reservations for one or more SATA drives (e.g., 104a, 104b, 104c, and/or 104d) coupled thereto, and storing reservation information in memory 154. Reservation information stored in memory 154 may be accessed by integrated circuit 152 to cause integrated circuit 152 to provide reservations for one or more SATA devices comprised in mass storage 104, as will be described below.

When initiator engine 142 establishes a connection with expander device 150, initiator engine 142 may be capable of determining if the expander device 150 is capable of providing reservations for one or more SATA devices coupled to the expander device 150. Also, initiator engine 142 may be capable of exchanging commands and data with expander device 150 to define persistent reservations which may be carried out by expander device 150. Reservations information, which may be defined for one or more SATA drives connected to expander device 150, may be stored in memory 156 to permit expander device 150 to maintain reservations across power cycles, and may thus form a persistent reservation.

As stated, initiator engine 142 may communicate with expander 150 using SSP communication transport protocols. If a SATA device is coupled to expander 150, protocol translator circuitry 156 may be capable of translating SSP communication transport protocols generated by initiator engine 142 to SATA communication protocols to communicate with one or more SATA compliant devices coupled to expander 150. In operation, if initiator 142 generates a SCSI command to request a reservation with one or more SATA devices (coupled to expander 150), integrated circuit 152 may be capable of enabling the request for a reservation, and storing reservation information in memory 154. Integrated circuit 152 may also be capable determining if a reservation already exists between an initiator engine and one or more SATA devices, and may block access to a SATA drive from one initiator engine if a reservation exists for a different initiator engines. Reservations, in this embodiment may be established on a per PHY basis and/or established globally for one or more SATA devices couple to expander 150. Configuration status for one or more PHYs comprised in expander 150 may be stored in memory 154.

This embodiment equally contemplates that drives other than SATA compliant devices may be connected to expander 150 (for example SAS compliant drives and/or FC compliant devices), and may augment a network cluster of SATA device and/or form additional network clusters. Expander device 150 may be capable of bypassing translation circuitry 156 to provide expander functionality to SAS and/or FC compliant drives coupled thereto, and to permit communication between circuit card 120 and SAS and/or FC compliant drives coupled to the expander 150. Of course, SAS initiator engine 142 may be capable of other operations (for example, generating other SCSI commands, for example, shared clustering context commands) as may be defined in the aforementioned SCSI Primary Commands without departing from this embodiment, and reservations is provided only as an example of SCSI operations which may be performed by expander 150 of this embodiment.

Figure 3:
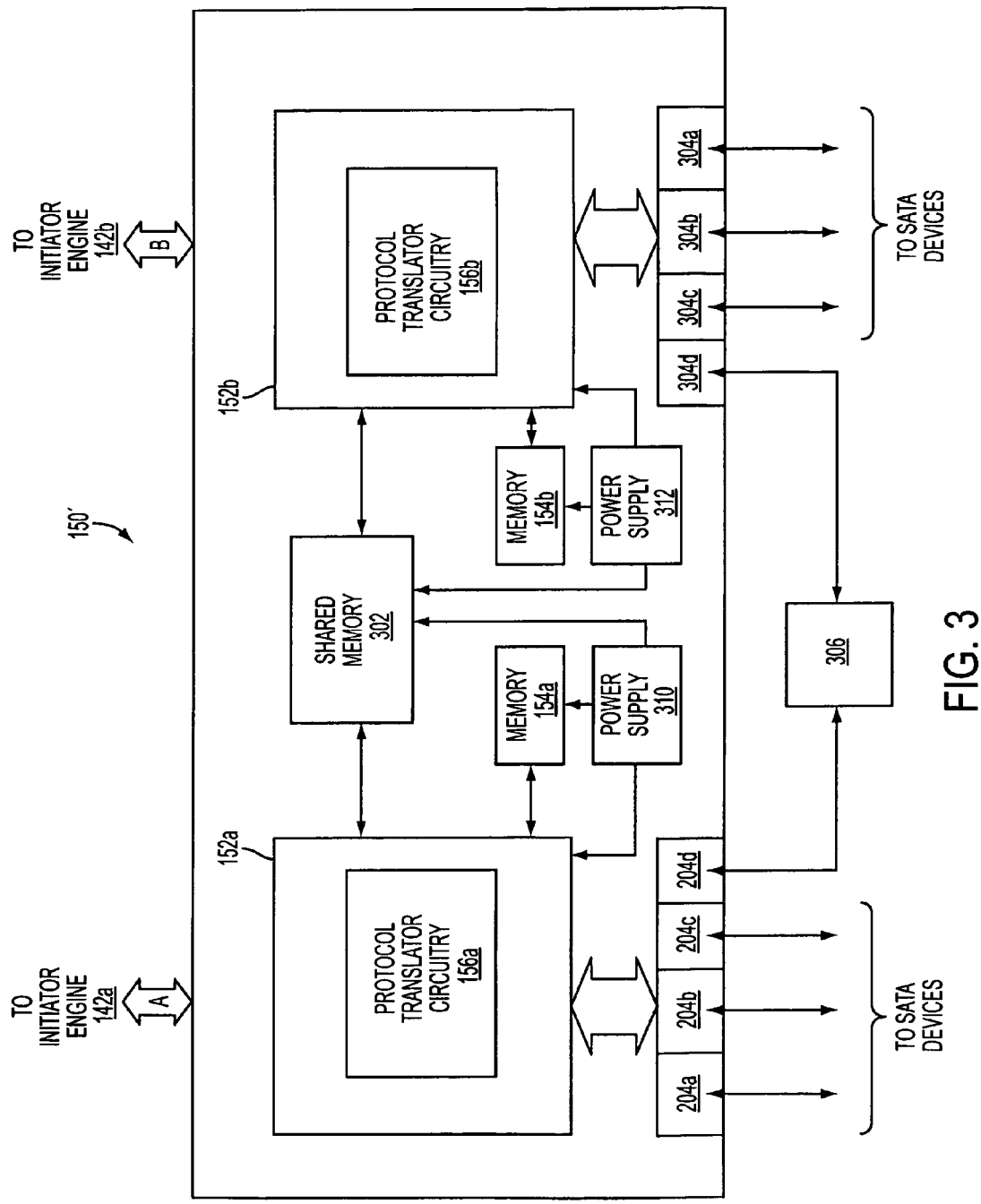
FIG. 3 is a diagram illustrating another exemplary expander according to one embodiment.

FIG. 3 depicts another exemplary embodiment of an expander 150'. In FIG. 3, certain portions of the system 100 depicted in FIG. 1 have been omitted for clarity (for example circuit board 132 and circuit card 120), but it is to be understood that like parts of FIG. 3 can be implemented in a manner consistent with an embodiment depicted in FIG. 1 and/or FIG. 2, or alternatively in other system implementations, without departing from this embodiment. This embodiment depicts two SAS initiator engines 142A and 142B coupled to expander 150' via connection A and connection B, respectively. It should be understood that each SAS initiator engine 142A and 142B may be comprised in separate circuit cards (for example circuit card 120 depicted in FIG. 1), and each initiator engine 142A and 142B may represent a multiple host system environment. SAS initiator engines 142A and 142B may comprise identical circuitry and offer identical functionality as described above with reference to SAS initiator engine 142, or alternatively may comprise different and/or additional circuitry. Of course, additional SAS initiator engines may be provided without departing from the scope of this embodiment.

Expander 150' of this embodiment may comprise redundant and/or independent integrated circuits 152a and 152b, each of which may be identical to each other. Integrated circuits 152a and 152b may each operate as independent expanders as described above with reference to FIG. 2, and may offer redundant functionality with respect to each other. In this embodiment, integrated circuits 152a and 152b may each comprise respective protocol translation circuitry 156a and 156b. It should be understood that, except as provided in the description of this embodiment, integrated circuits 152a and 152b and protocol translation circuitry 156a and 156b may operate according to the description of integrated circuit 152 and protocol translation circuitry 156, respectively, as provided herein with reference to FIGS. 1 and 2. Of course, additional integrated circuits and/or additional expanders may be provided without departing from the scope of this embodiment.

Expander device 150' may also comprise shared memory 302. Shared memory 302 may store one or more SCSI commands and may be accessible by integrated circuits 152a and 152b to permit, for example, reservations to be established by one integrated circuit 152a or 152b. Expander 150' may also include individual memories 154a and 154b for each respective integrated circuit 152a and 152b. The expander 150' of the embodiment of FIG. 3 may also include two independent power supplies 310 and 312 which be capable of supplying power to integrated circuits 152a and 152b and memory 154a and 154b, respectively, and each may further be capable of independently supplying power to shared memory 302. Independent power supplies 310 and 312 may provide, for example, fault-tolerance between integrated circuits 152a and 152b and memory 154a 154b, which may permit power interruption on one of these but still allow the expander device 150' to operate. "Independent power supply" as used herein, may be defined as a power supply that may be capable of supplying power to integrated circuit 152a or 152b, memory 154a or 154b and shared memory 302 independent of other power supplies that may be provided in expander 150'. In operation, for example, if independent power supply 310 fails to supply power to integrated circuit 152a and memory 154a, independent power supply 312 may still operate to supply power to 152b and memory 154b and shared memory 302, thereby permitting expander operations between initiator engine 142b and SAT devices coupled to expander 150' to proceed. Thus, independent power supply 310 may be independent of independent power supply 312 and may thus provide fault-tolerance between the independent expanders represented by integrated circuit 152a, memory 154a and integrated circuit 152b, memory 154b.

Expander device 150' may comprise a plurality of redundant and/or independent downstream PHYs. For example, PHYs 204a, 204b, 204c may couple one or more SATA drives to integrated circuit 152a to permit communication between initiator engine 142a and one or more SATA devices coupled to expander 150'. Likewise, PHYs 304a, 304b, 304c may be provided to couple one or more SATA device to integrated circuit 152b to permit communication between initiator engine 142b and one or more SATA device coupled to expander 150'. As with the previous embodiment, integrated circuit 152a and/or integrated circuit 152b and/or initiator engine 142a and/or initiator engine 142b may be capable of designating SAS communication protocol target PHYs and one or more upstream PHYs as SATA communication protocol target PHYs. Of course, expander 150' of this embodiment may also include a plurality of respective upstream PHYs (not shown) for each integrated circuit 152a and 152b. Upstream PHYs may couple the expander 150' to initiator engines 142a and 142b using connection path A and B, respectively. As with the previous embodiment, one or more upstream PHYs in expander 150' may be designated as target SSP PHYs to provide communication between a SAS initiator engine (for example, initiator engines 142a and/or 142b) and integrated circuits 152a and/or 152b using the aforementioned SSP communications protocol. Configuration status of one or more PHYs comprised in expander 150' may be stored in memory 154a, 154b and/or shared memory 302.

In this embodiment, one or more dual-ported SATA devices 306 may be coupled to both integrated circuits 152a and 152b. For example, "Dual-ported device", as used herein, may be defined as a device that can be coupled to one or more expanders. In this exemplary embodiment, dual-ported SATA device 306 may be coupled to integrated circuit 152a via downstream PHY 204d, and to integrated circuit 152b via downstream PHY 304d. In this manner, and as will be described in greater detail below initiator engines 142a and 142b may be capable of exchanging commands and data with device 306 via expander 150'. In this embodiment, integrated circuits 152a and 152b may operate as independent expanders which may be provided in a single enclosure, for example, expander 150'.

As stated, shared memory 302 may store of SCSI commands for persistant reservations generated by integrated circuits 152a and 152b. Shared memory 302 may also store other information related to the operation of integrated circuits 152a and 152b, context and/or state information and/or any other information. Any data stored in shared memory 302 may be shared by each integrated circuit 152a and 152b. Thus, integrated circuit 152a and 152b may communicate with each other via shared memory 302.

Figure 4:
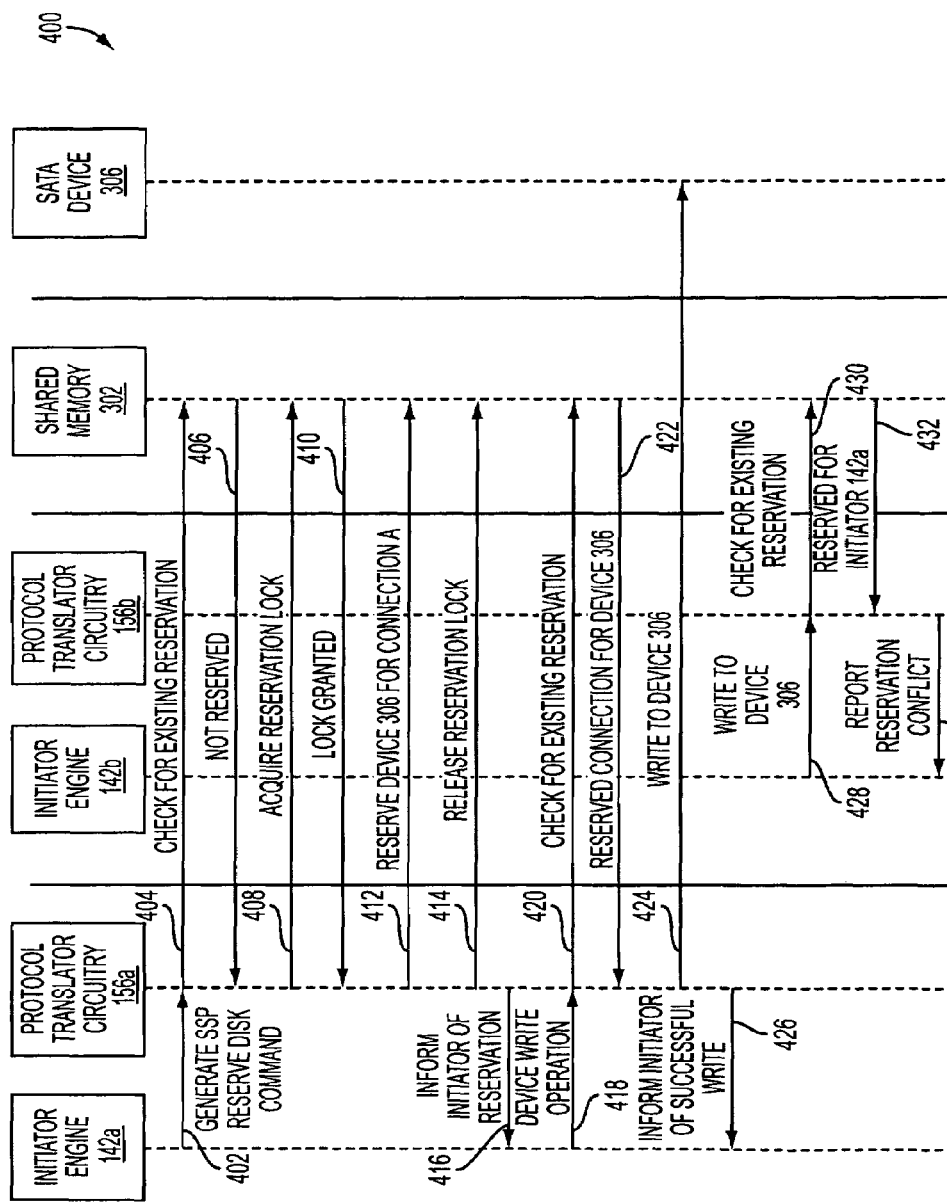
FIG. 4 is a diagram illustrating exemplary operations according to one embodiment.

FIG. 4 depicts a diagram 400 illustrating operations which may be performed by an embodiment. In FIG. 4, certain portions of the system 100 depicted in FIG. 1 and the expander 150' of FIG. 3 have been omitted for clarity (for example circuit board 132 and circuit card 120), but it is to be understood that like parts of FIG. 4 can be implemented in a manner consistent with an embodiment depicted in FIGS. 1 and/or 3, or alternatively in other system implementations, without departing from this embodiment. The following description of the diagram 400 of FIG. 4 shall make specific reference operations for providing reservations between a dual-ported SATA device 306 (which may be comprised in mass storage 104 and coupled to expander 150' in a manner consistent with FIG. 3) and two or more initiator engines, for example initiator engines 142a and 142b. However, it should be understood that the following description can apply to any SATA device, whether or not comprised in mass storage 104, which may include, for example, a direct-attached dual-ported SATA device which may be coupled directly to expander 150'.

In this exemplary embodiment, assume that initiator engine 142a initiates communication with expander device 150' and target SATA device 306 to establish a reservation between initiator 142a and SATA device 306. Also, in this exemplary embodiment, initiator engines 142a and 142b may be capable of generating SCSI commands (for example, reservation commands) and communicating with expander 150' using SSP communication transport protocols, and protocol translation circuitry 156a and/or 156b may be capable of translating SAS communication protocols into SATA communication protocols (and vice-versa) to permit a SAS initiator engine to exchange commands and data with a SATA device.

Initiator engine may be capable of generating an SCSI "RESERVE DISK" command to expander 150', as depicted in operation 402, to create a reservation between initiator engine 142a and SATA device 306. Protocol translation circuitry 156a may be capable of checking shared memory 302 for an existing reservation 404. If a reservation does not already exist (as may be reported from memory 302 in operation 406), protocol translation circuitry 152a may generate a request to acquire a reservation lock with shared memory 302, as depicted by operation 408. A reservation lock may operate to block other reservation requests, as may be generated by other initiator engines, until a reservation is established between initiator engine 142a and SATA device 306. If no other requests are pending, memory 302 may be capable of granting the lock request 410. Protocol translation circuitry 152a may be capable of creating a reservation between initiator engine 142a (coupled to expander 150' via connection A) and dual-ported SATA device 306, as depicted in operation 412. Protocol translator circuitry 156a may also be capable of generating a signal sequence to release the reservation lock in shared memory 302, as depicted in operation 414, and informing initiator engine 142a that a reservation is established 416.

Initiator engine 142a may generate a disk write operation request 418 to protocol translator circuitry 156a in an attempt to write data to SATA device 306. Protocol translator circuitry 156a may be capable of checking memory 302 for an existing reservation 420 between initiator engine 142a and SATA device 306. If a reservation exists 422, protocol translator circuitry 156a may translate write requests from initiator engine 142a and generate appropriate ATA/ATAPI commands to SATA device 306 to write data thereto, as depicted in operation 424. Protocol translator circuitry 156a may also be capable of informing initiator engine 142a of a successful write 426, as may be reported by SATA device 306.

Once a reservation is established between initiator engine 142a and dual-ported SATA device 306, initiator engine 142b (or other initiator engine, not shown) may attempt to write data to SATA device 306, as depicted in operation 428. Since initiator engine 142b, in this embodiment, communicates with protocol translator 156b via connection B, protocol translator 156b may be capable of checking memory 302 for an existing reservation 430. Memory 302 may be capable of reporting a reservation between initiator 142a and SATA device 306 to protocol translator circuitry 156b, as depicted in operation 432. Protocol translator circuitry 156b may also be capable of reporting a reservation conflict to initiator engine 142b, as depicted in operation 434.

Although embodiments herein describe creating reservations for SATA devices, it should be understood that this disclosure may also provide reservations for SAS devices that do not support persistent reservations. Also, the expander device may be capable of creating reservations between one or more initiator engines and one or more SATA devices. Also, embodiments herein describe the functionality of the expander 150 and/or expander 150' for creating and maintaining reservations, however, it should be understood that other integrated circuits may be capable of such functionality, for example, integrated circuits comprised in circuit card 120 and/or host system motherboard 132.

Thus, in summary, at least one embodiment herein may provide an expander device that may be capable of communicating with at least one initiator engine using at least a first communication protocol and at least one target storage device using at least a second communication protocol. The expander device of this embodiment may also be capable of between first commands transmitted using the first communication protocol and second commands transmitted using the second communication protocol.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an expander device capable of communicating with at least one initiator engine using at least a first communication protocol and at least one multi-ported Serial Advanced Technology Attachment (SATA) target storage device using at least a second communication protocol, said first communication protocol comprising a Serial Attached Small Computer System Interface (SCSI) Protocol (SAS) and said second communication protocol comprising a SATA protocol, said expander device is further capable of translating between first commands transmitted using said first communication protocol and second commands transmitted using said second communication protocol, said expander device being further configured to receive at least one SCSI command to provide reservations for said at least one multi-ported SATA target storage device, wherein said at least one initiator engine is configured to determine if said expander device is configured to provide at least one reservation for said at least one multi-ported SATA target storage device.

2. The apparatus of claim 1, wherein:
wherein said first commands comprising SCSI commands and said second commands comprising Advanced Technology Attachment With Packet Interface (ATA/ATAPI) commands.

3. The apparatus of claim 1, wherein:
said expander device comprising a plurality of upstream physical interfaces (PHYs) capable of coupling said expander device to at least one said initiator engines, and a plurality of downstream PHYs capable of coupling said expander device to said at least one multi-ported SATA target storage device.

4. The apparatus of claim 3, wherein:
said expander device is further capable of assigning at least one said upstream PHY as a target for said first communication protocol and at least one downstream PHY as a target for said second communication protocol.

5. The apparatus of claim 1, wherein:
said expander device further capable of receiving a request for said at least one reservation from one or more said initiator engines, said expander device further capable of determining if a reservation conflict exists between the request for said at least one reservation and an existing reservation.

6. The apparatus of claim 1, wherein:
said expander device further capable of storing reservation information in memory.

7. The apparatus of claim 6, wherein:
said expander device further capable of retrieving reservation information from said memory after a power cycle of said expander device.

8. The apparatus of claim 1, wherein:
said expander device comprises a first integrated circuit capable of communicating with a first said initiator engine using said first communication protocol and said at least one multi-ported SATA target storage devices using said second communication protocol, and a second integrated circuit capable of communicating with a second said initiator engine using said first communication protocol and at least a selected one of said multi-ported SATA storage devices using said second communication protocol.

9. The apparatus of claim 8, wherein:
said expander device further comprising shared memory capable of storing data from said first integrated circuit and said second integrated circuit, said shared memory is also capable of sharing data stored therein between said first and second integrated circuits.

10. The apparatus of claim 8, wherein:
said expander device further comprising a first independent power supply capable of supply power, at least in part, to said first integrated circuit, and a second independent power supply capable of supplying power at least in part, to said second integrated circuit.

11. A system, comprising:
at least one circuit card capable of communicating in accordance with a plurality of different communication protocols, said at least one circuit card being capable of being coupled to a bus, and an expander device capable of communicating with said circuit card using at least a first communication protocol and at least one multi-ported Serial Advanced Technology Attachment (SATA) target storage device using at least a second communication protocol, said first communication protocol comprising a Serial Attached Small Computer System Interface (SCSI) Protocol (SAS) and said second communication protocol comprising a SATA protocol, said expander device is further capable of translating between first commands transmitted using said first communication protocol and second commands transmitted using said second communication protocol, said expander device being further configured to receive at least one SCSI command to provide reservations for said at least one multi-ported SATA target storage device, wherein said circuit card is configured to determine if said expander device is capable of providing at least one reservation for said at least one multi-ported SATA target storage device.

12. The system of claim 11, wherein:
said first commands comprising SCSI commands and said second commands comprising Advanced Technology Attachment With Packet Interface (ATA/ATAPI) commands.

13. The system of claim 11, wherein:
said expander device comprising a plurality of upstream physical interfaces (PHYs) capable of coupling said expander device to at least one said initiator engines, and a plurality of downstream PHYs capable of coupling said expander device to said at least one multi-ported SATA target storage device.

14. The system of claim 13, wherein:
said expander device is further capable of assigning at least one said upstream PHY as a target for said first communication protocol and at least one downstream PHY as a target for said second communication protocol.

15. The system of claim 11, wherein:
said expander device further capable of receiving a request for said at least one reservation from one or more said initiator engines, said expander device further capable of determining if a reservation conflict exists between the request for said at least one reservation and an existing reservation.

16. The system of claim 11, wherein:
said expander device further capable of storing reservation information in memory.

17. The system of claim 16, wherein:
said expander device further capable of retrieving reservation information from said memory after a power cycle of said expander device.

18. The system of claim 11, wherein:
said expander device comprises a first integrated circuit capable of communicating with a first said initiator engine using said first communication protocol and said at least one multi-ported SATA target storage devices using said second communication protocol, and a second integrated circuit capable of communicating with a second said initiator engine using said first communication protocol and at least a selected one of said multi-ported SATA storage devices using said second communication protocol.

19. The system of claim 18, wherein:
said expander device further comprising shared memory capable of storing data from said first integrated circuit and said second integrated circuit, said shared memory is also capable of sharing data stored therein between said first and second integrated circuits.

20. The system of claim 18, wherein:
said expander device further comprising a first independent power supply capable of supply power, at least in part, to said first integrated circuit, and a second independent power supply capable of supplying power at least in part, to said second integrated circuit.

21. An article comprising:
a storage medium having stored thereon instructions that when executed by a machine result in the following operations:
communicating, by an expander device, with at least one initiator engine using at least a first communication protocol and at least one multi-ported Serial Advanced Technology Attachment (SATA) target storage device using at least a second communication protocol, said first communication protocol comprising a Serial Attached Small Computer System Interface (SCSI) Protocol (SAS) and said second communication protocol comprising a SATA protocol, and;
translating, by said expander device, between first commands transmitted using said first communication protocol and second commands transmitted using said second communication protocol, said expander device being further configured to receive at least one SCSI command to provide reservations for said at least one multi-ported SATA target storage device, wherein said at least one initiator engine is configured to determine if said expander device is capable of providing at least one reservation for said at least one multi-ported SATA target storage device.

22. The article of claim 21, wherein:
said first commands comprising SCSI commands and said second commands comprising Advanced Technology Attachment With Packet Interface (ATA/ATAPI) commands.

23. The article of claim 21, wherein:
said expander device comprising a plurality of upstream physical interfaces (PHYs) capable of coupling said expander device to at least one said initiator engines, and a plurality of downstream PHYs capable of coupling said expander device to said at least one multi-ported SATA target storage device.

24. The article of claim 23, wherein said instructions that when executed by said machine result in the following additional operations:
assigning, by said expander device, at least one said upstream PHY as a target for said first communication protocol and at least one downstream PHY as a target for said second communication protocol.

25. The article of claim 21, wherein said instructions that when executed by said machine result in the following additional operations:
receiving, by said expander device, a request for said at least one reservation from one or more said initiator engines, and determining, by said expander device, if a reservation conflict exists between the request for said at least one reservation and an existing reservation.

26. The article of claim 25, wherein said instructions that when executed by said machine result in the following additional operations:
storing, by said expander device, reservations information in memory.

27. The article of claim 26, wherein said instructions that when executed by said machine result in the following additional operations:
retrieving, by said expander device, said reservation information from said memory after a power cycle of said expander device.

28. The article of claim 21, wherein:
said expander device comprises a first integrated circuit capable of communicating with a first said initiator engine using said first communication protocol and said at least one multi-ported SATA target storage device using said second communication protocol, and a second integrated circuit capable of communicating with a second said initiator engine using said first communication protocol and at least a selected one of said multi-ported SATA storage devices using said second communication protocol.

29. The article of claim 28, wherein:
said expander device further comprising shared memory capable of storing data from said first integrated circuit and said second integrated circuit, said shared memory is also capable of sharing data stored therein between said first and second integrated circuits.

30. The article of claim 28, wherein:
said expander device further comprising a first independent power supply capable of supply power, at least in part, to said first integrated circuit, and a second independent power supply capable of supplying power at least in part, to said second integrated circuit.

31. A method, comprising:
communicating, by an expander device, with at least one initiator engine using at least a first communication protocol and at least one multi-ported Serial Advanced Technology Attachment (SATA) target storage device using at least a second communication protocol, said first communication protocol comprising a Serial Attached Small Computer System Interface (SCSI) Protocol (SAS) and said second communication protocol comprising a SATA protocol, and;
translating, by said expander device, between first commands transmitted using said first communication protocol and second commands transmitted using said second communication protocol, said expander device being further configured to receive at least one SCSI command to provide reservations for said at least one multi-ported SATA target storage device, wherein said at least one initiator engine is configured to determine if said expander device is capable of providing at least one reservation for said at least one multi-ported SATA target storage device.

32. The method of claim 31, wherein:
said first commands comprising SCSI commands and said second commands comprising Advanced Technology Attachment With Packet Interface (ATA/ATAPI) commands.

33. The method of claim 31, wherein:
said expander device comprising a plurality of upstream physical interfaces (PHYs) capable of coupling said expander device to at least one said initiator engines, and a plurality of downstream PHYs capable of coupling said expander device to said at least one multi-ported SATA target storage device.

34. The method of claim 33, further comprising:
assigning, by said expander device, at least one said upstream PHY as a target for said first communication protocol and at least one downstream PHY as a target for said second communication protocol.

35. The method of claim 31, further comprising:
receiving, by said expander device, a request for said at least one reservation from one or more said initiator engines, and determining, by said expander device, if a reservation conflict exists between the request for said at least one reservation and an existing reservation.

36. The method of claim 35, further comprising:

storing, by said expander device, reservations information in memory.

37. The method of claim 36, further comprising:

retrieving, by said expander device, said reservation information from said memory after a power cycle of said expander device.

38. The method of claim 31, wherein:

said expander device comprising a first integrated circuit capable of communicating with a first said initiator engine using said first communication protocol and said at least one multi-ported SATA target storage devices using said second communication protocol, and a second integrated circuit capable of communicating with a second said initiator engine using said first communication protocol and at least a selected one of said multi-ported Serial Advanced Technology Attachment (SATA) storage devices using said second communication protocol.

39. The method of claim 38, further comprising:

storing data from said first integrated circuit and said second integrated circuit; and sharing data stored in said shared memory between said first and second integrated circuits.

40. The method of claim 38, further comprising:

supplying independent power to said first integrated circuit; and supplying independent power to said second integrated circuit.

* * * * *

UNITED STATES PATENT AND TRADEMARK OFFICE
CERTIFICATE OF CORRECTION

| | | |
|---|---|---|
| PATENT NO. | : 7,370,128 B2 | Page 1 of 1 |
| APPLICATION NO. | : 10/976536 | |
| DATED | : May 6, 2008 | |
| INVENTOR(S) | : Douglas et al. | |

It is certified that error appears in the above-identified patent and that said Letters Patent is hereby corrected as shown below:

In column 11, line 44, in Claim 8, delete "devices" and insert -- device --, therefor.

In column 12, line 56, in Claim 18, delete "devices" and insert -- device --, therefor.

In column 15, line 16, in Claim 38, delete "devices" and insert -- device --, therefor.

Signed and Sealed this

Twenty-sixth Day of August, 2008

JON W. DUDAS
*Director of the United States Patent and Trademark Office*